(No Model.)
2 Sheets—Sheet 1.

J. H. DUNBAR.
CHURN.

No. 266,253.　　　　　　　　　　Patented Oct. 17, 1882.

Witnesses
Thomas J. Bewley
Chas. A. Duy

Inventor
John H. Dunbar
per Stephen Ustick, att.

(No Model.)

J. H. DUNBAR.
CHURN.

No. 266,253.

2 Sheets—Sheet 2.

Patented Oct. 17, 1882.

Witnesses
Thomas J. Bewley.
Chas. A. Duy.

Inventor
John H. Dunbar,
per Stephen Ustick, atty

UNITED STATES PATENT OFFICE.

JOHN H. DUNBAR, OF PHILADELPHIA, PENNSYLVANIA, ASSIGNOR TO CLEMENT & DUNBAR, OF SAME PLACE.

CHURN.

SPECIFICATION forming part of Letters Patent No. 266,253, dated October 17, 1882.

Application filed January 9, 1882. (No model.)

*To all whom it may concern:*

Be it known that I, JOHN H. DUNBAR, a citizen of the United States, residing at Philadelphia, in the county of Philadelphia and State of Pennsylvania, have invented a new and useful Improvement in Churns, of which the following is a specification.

The principal object of my invention is such a construction of the dasher as will adapt it to be passed into the churn through a comparatively small mouth and still have the wings in their combined action to strike against all parts of the cream. Another object is such an arrangement of the wings of the dasher as will tend to effectually break up and crush the globules of the cream.

The nature of my invention by which these objects are accomplished consists, in the first place, in the arrangement of two of the wings of the dasher at opposite sides thereof, as near its axis as practicable, for the purpose of having the dasher narrow in one direction, and thus to provide for its being inserted into the churn through a comparatively narrow mouth, whereby to diminish the circumferential surface of the churn as little as possible for the more complete action of the dasher, as hereinafter described. The intermediate two wings are so arranged farther from the axis of the dasher than the above mentioned as to strike the cream which they miss in their revolutions, and are curved in their longitudinal direction in such a manner as to admit of the dasher, when canted, being passed into the churn through a short mouth, whereby to leave sufficient surface for the hoops at the ends of the churn.

The nature of my invention, in the second place, consists in having the outer two of the wings at opposite sides of the dasher, with their outer edges inclined forward in the direction of their revolutions to force the cream toward the axis of the dasher, and the other two inclined in the contrary direction, so as to produce two currents of cream in opposite directions, for the effectual breaking up of the globules of the cream.

Figure 1:
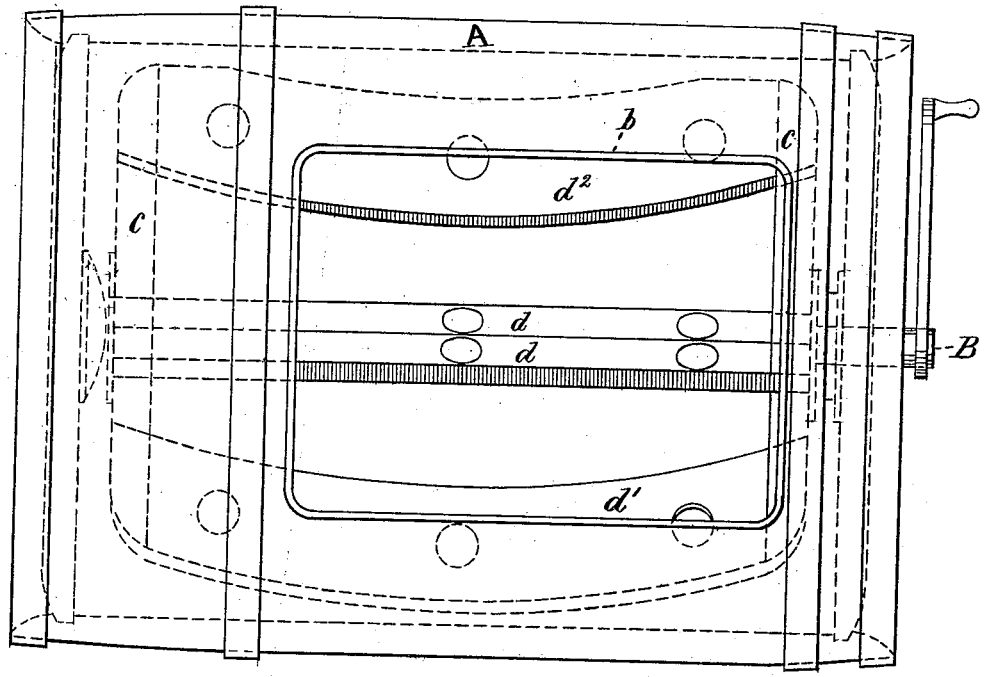
Figure 2:
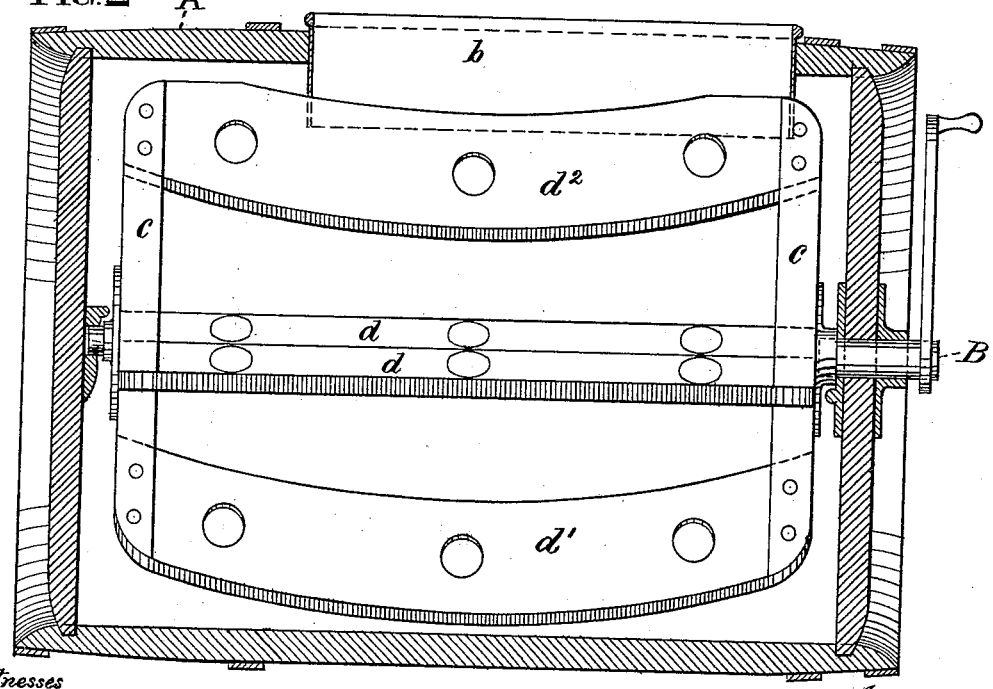
Figure 3:
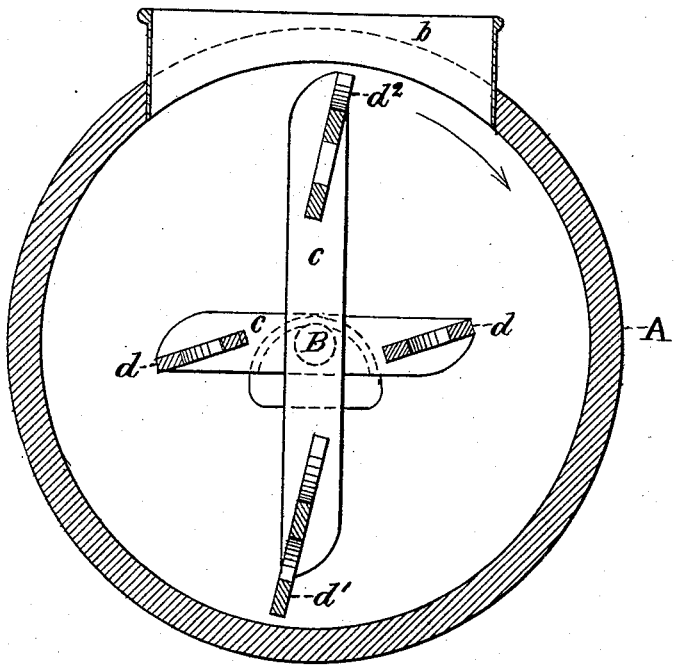
Figure 4:
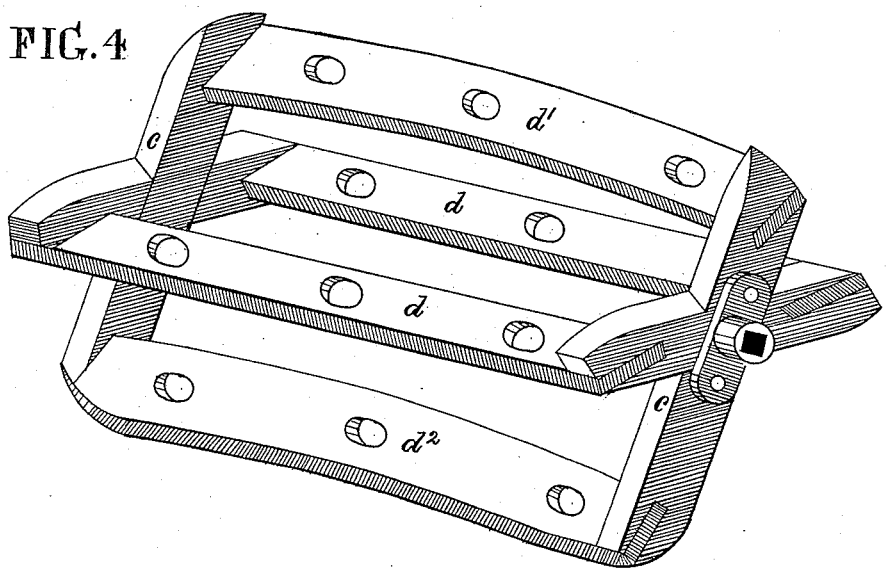

In the accompanying drawings, which make a part of this specification, Figure 1 is a top view of the churn A with the dasher in its position. Fig. 2 is a longitudinal vertical section of the same. Fig. 3 is a cross-section illustrating the fact that the dasher admits of being passed into the churn through a comparatively small mouth, and to fill it up in such a manner as to act thoroughly in its revolutions upon all parts of the cream. Fig. 4 on Sheet No. 2 is a perspective view of the dasher.

Like letters of reference in all the figures indicate the same parts.

A represents the barrel of the churn, having a mouth or inlet-opening, $b$.

B is the axle of the dasher, which has cross-arms $c$, to which are connected the wings $d\ d$ and $d'\ d^2$. For the double purpose of having as narrow a mouth as possible to the churn for the passage of the dasher into it, whereby to have its inner circumferential surface reduced as little as practicable, so as to confine the cream to the action of the dasher, and thus to have two opposite wings, $d\ d$, act upon the cream near the center of the churn, these wings are placed near the axis of the dasher, so as to make the same narrow in one direction, as shown in Fig. 3; and to fill up the spaces toward the circumference of the churn missed by these wings in their revolutions the wings $d'$ and $d^2$ are arranged farther from the axis of the dasher, as represented, whereby all parts of the cream are acted upon by the combined action of the wings. As the dasher has to be canted in passing it into the churn, the wing $d'$, which is farther from the axis than the wing $d^2$, and the lower wing in the passage, is rounded off at the ends of its outer edge to admit of passing through as short a mouth as possible, to leave ample room at the ends of the churn for hooping, the middle part of the edge being of corresponding swelled form, so as to strike the cream near the circumferential surface of the churn. The other wing, $d^2$, is of concave form, so as to admit of an easy passage into the churn, and its ends are left fuller than the ends of the wing $d'$, so as to strike the cream missed by them in the revolutions of the dasher. The wings $d'$ and $d^2$, which are nearer the circumferential surface of the churn than the wings $d\ d$, have their outer edges inclined forward in the direction of the revolutions of the dasher to force the cream from the circumference of the churn toward the center thereof, and the two intermediate wings, $d\ d$, are inclined in the opposite direction to force the cream from the center toward the circumference. Two opposite currents of the cream being thus produced in connection with the concussions caused by the wings suddenly striking the cream, its globules are completely broken up.

I claim as my invention—

1. A dasher having its wings $d\ d$ as near the axis as practicable, and the wings $d'\ d^2$, intermediate thereto, farther from the center and curved lengthwise in opposite directions from each other, with their outer end corners rounded off, substantially in the manner and for the purpose set forth.

2. A dasher having two of its wings at opposite sides and farthest from its axis, inclined forward in the direction of the revolutions of the dasher to throw the cream from the circumference of the churn toward its center, and the outer edges of the intermediate wings inclined backward to throw the cream from the center toward the circumference, thus to produce two opposite currents of the cream to strike against each other, whereby, in connection with the concussions produced by the sudden striking of the wings upon the cream, its globules will be thoroughly broken up, substantially as described.

JOHN H. DUNBAR.

Witnesses:
STEPHEN USTICK,
WM. LARZELERE.